Aug. 2, 1955 L. D. BAKKE ET AL 2,714,376
POWER PLANTS

Filed Nov. 3, 1951 5 Sheets-Sheet 1

INVENTORS
Laurence D. Bakke
Peter Altman
BY
Hauke & Hardesty
Attorneys

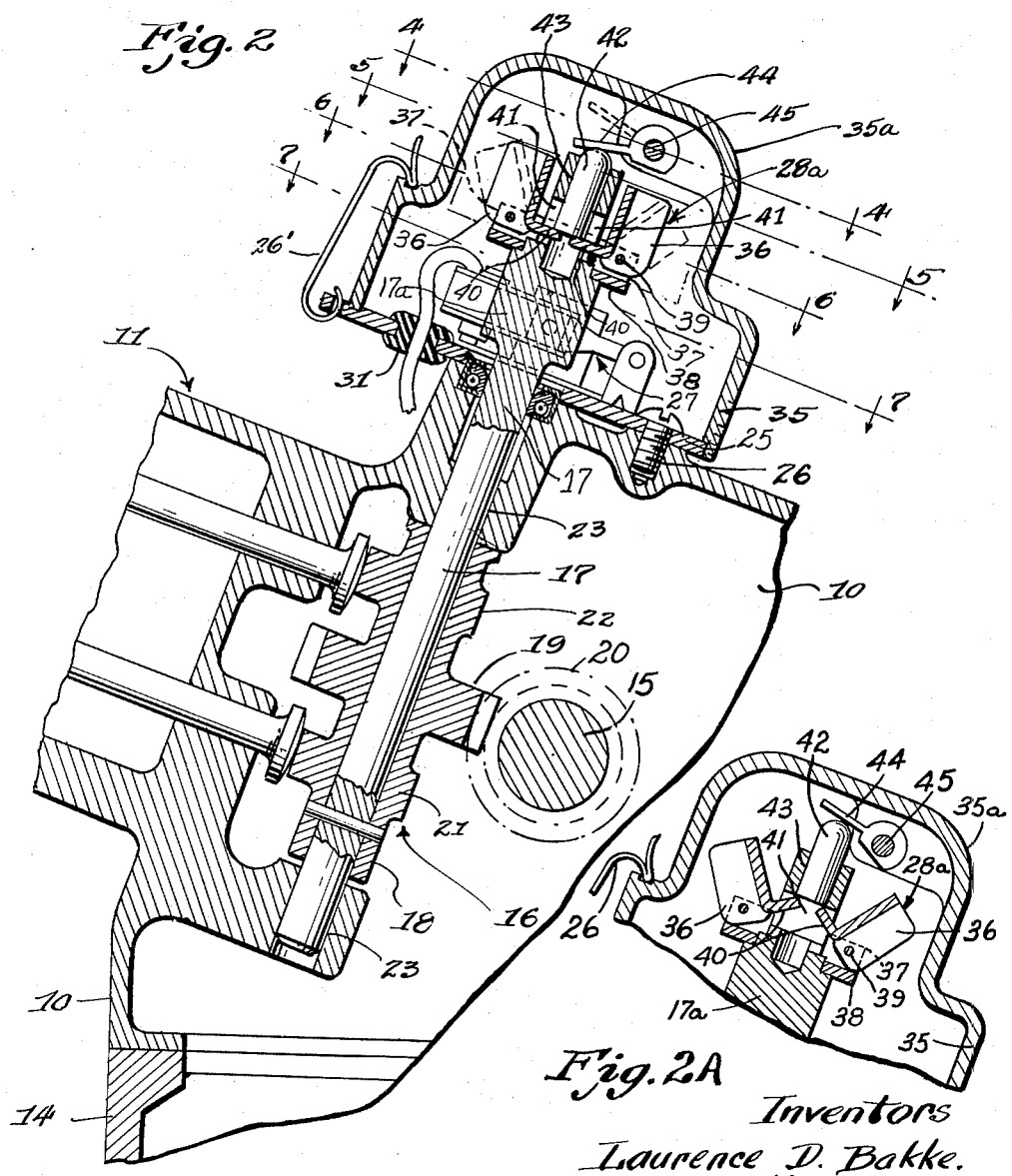

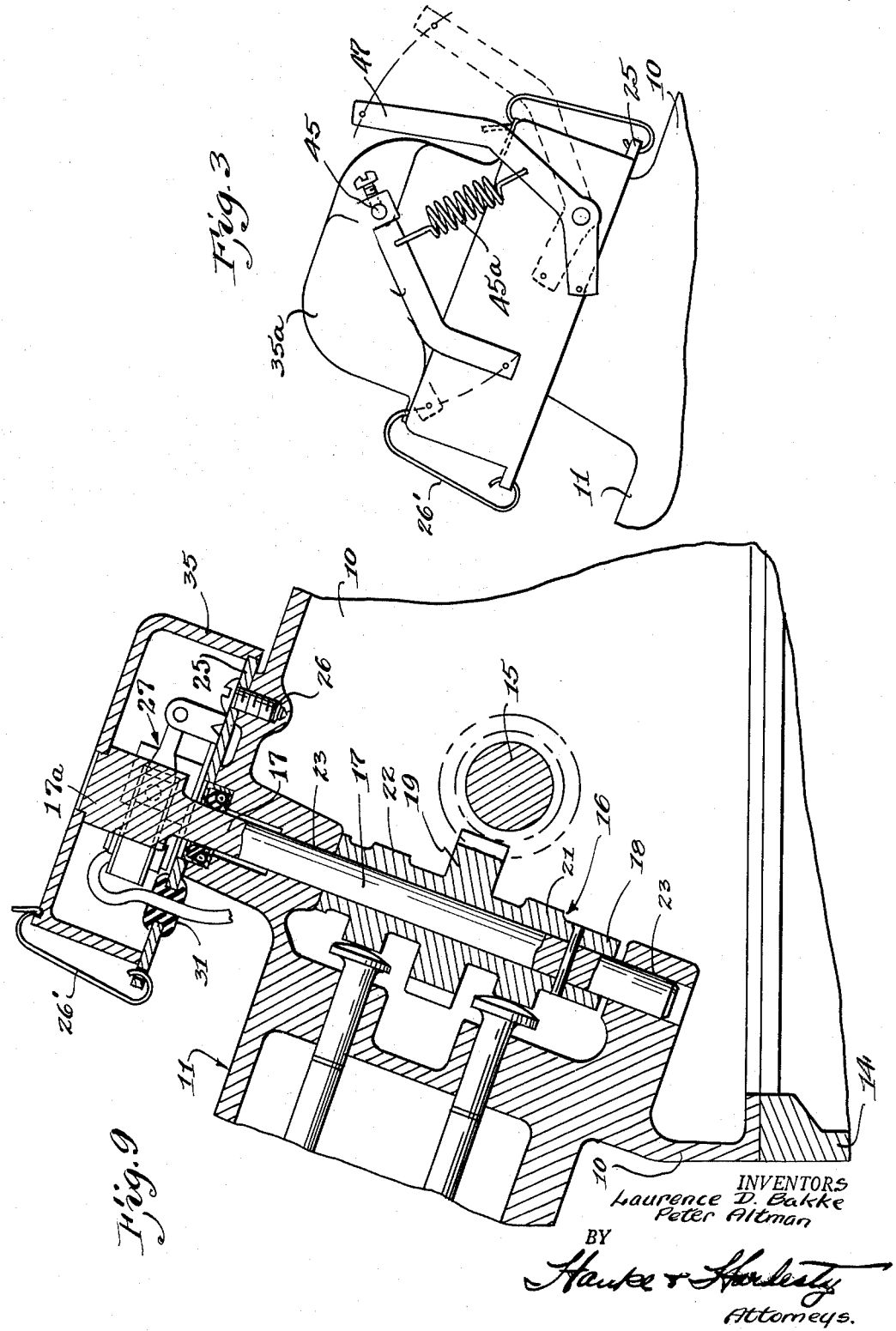

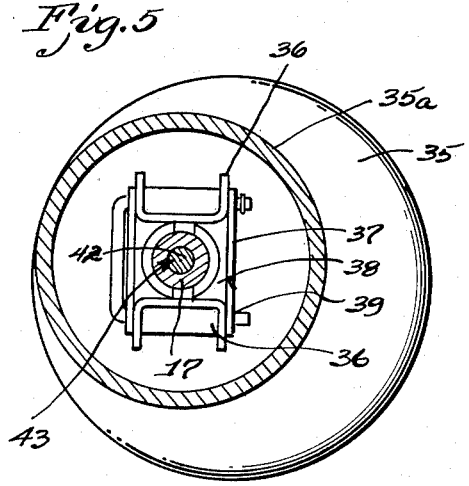
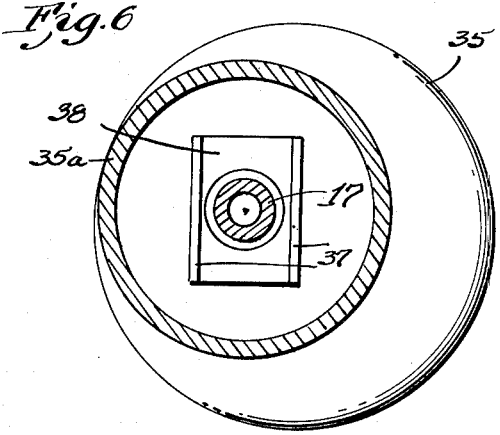
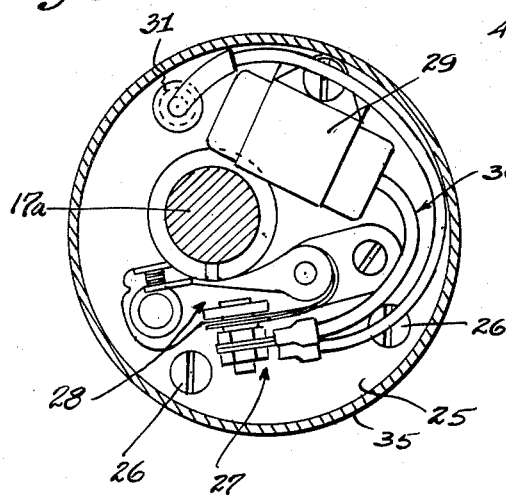
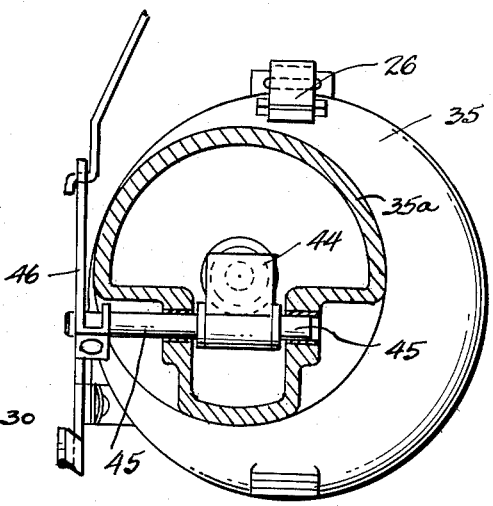

Aug. 2, 1955 L. D. BAKKE ET AL 2,714,376
POWER PLANTS

Filed Nov. 3, 1951 5 Sheets-Sheet 5

INVENTORS
Laurence D. Bakke
Peter Altman
BY
Hauke + Hardesty
Attorneys.

United States Patent Office 2,714,376
Patented Aug. 2, 1955

2,714,376

POWER PLANTS

Laurence D. Bakke, Plymouth, and Peter Altman, Detroit, Mich., assignors to Continental Motors Corporation, Detroit, Mich., a corporation of Virginia Application November 3, 1951, Serial No. 254,731

8 Claims. (Cl. 123—195)

Our invention relates to portable power plants, more particularly to that type of power plant embodying a single engine cylinder, referred to generally as a small portable engine and used generally for powering lawnmowers and other powered garden equipment such as small hand tractors and cultivators, and for use with industrial equipment such as small grinders, mixers and the like.

These types of power plants require frequent servicing and adjustments, especially the ignition system as they are operated infrequently, and thus get out of adjustment. One part which requires frequent adjustment is the breaker system or distributor and the governor. It is customary to mount the breakers in the blower housing in juxtaposition to the magnetos, and the adjustment thereof, the replacement of worn breaker points necessitates the removal of the blower housing to get at these points to adjust or replace same. Also, access to the governors is not always readily had and in order to maintain such engines in proper working condition, it is neccessary to partially dismantle the engine from time to time.

It is therefore the principal object of our present invention to overcome the difficulties as generally pointed out above by providing a novel and compact engine assembly embodying a new arrangement for mounting the governor and to provide for a breaker system mounted externally of the engine so as to provide for ready access to such mechanism with a minimum of time and expense.

A further object of our invention is to simplify small engine construction to minimize manufacturing and maintenance costs and to provide an engine of improved operating characteristics by mounting the ignition breaker directly on an extension of the engine camshaft externally of the engine crankcase, and in some instances to superimpose a governor over said breaker, also secured to and driven by the camshaft, both said breaker and governor mechanism being mounted within and enclosed by a relatively dust and moisture proof housing, all of which assembly is advantageous from a practical point of view.

For a more detailed understanding of our invention reference may be had to the accompanying drawings illustrating a preferred embodiment of our invention, in which like parts are referred to by like characters throughout the several views, and in which Fig. 1 is a side elevational view of a small internal combustion engine embodying our improved breaker system and governor assembly.

Fig. 2A is a fragmentary detail view in section showing the weighted members of the governor moved to their outward limit of travel.

Fig. 2 is a vertical fragmentary sectional view through the engine taken as viewed from the opposite side of Fig. 1 and taken through the engine camshaft.

Fig. 3 is a fragmentary elevational view of the breaker housing showing the engine control levers and arms as are actuated by the governor mechanisms to control engine operation.

Figs. 4, 5, 6 and 7 are transverse sectional views through the breaker and governor mechanisms as taken respectively on the line 4—4, 5—5, 6—6, and 7—7 of Fig. 2.

Figure 1:
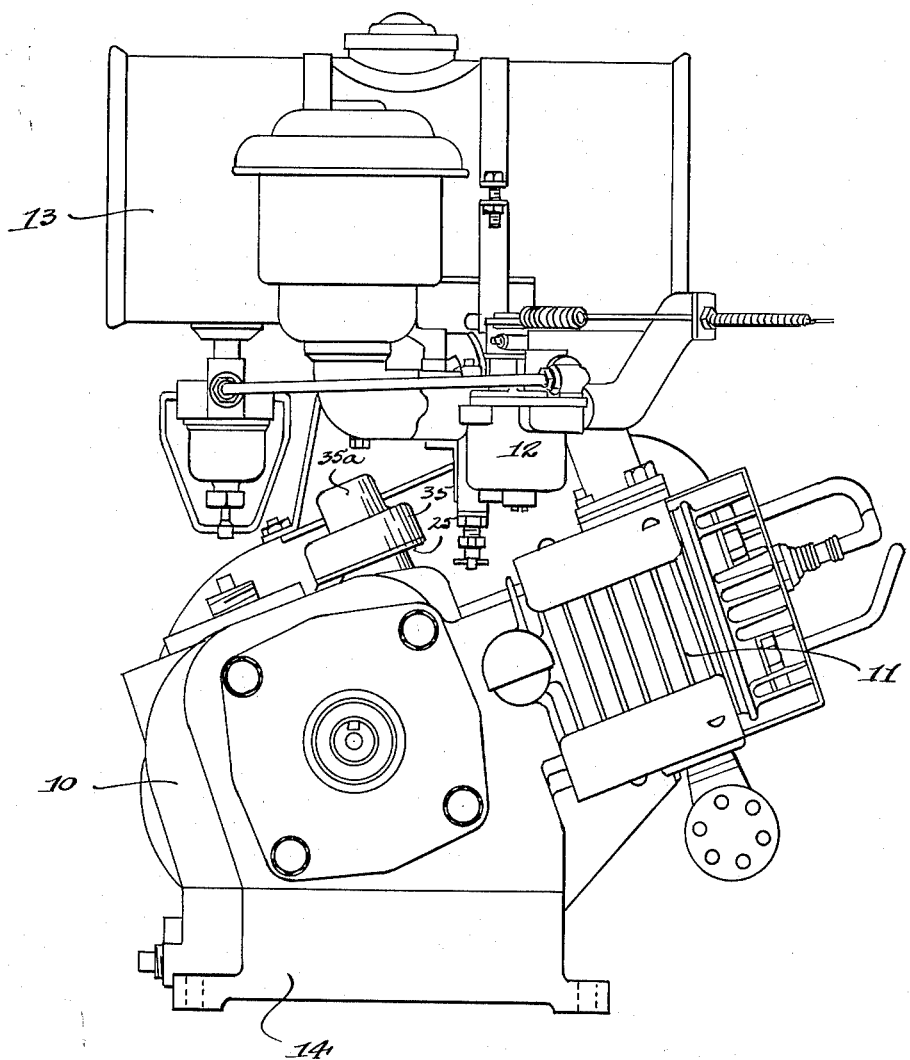
Figure 6:
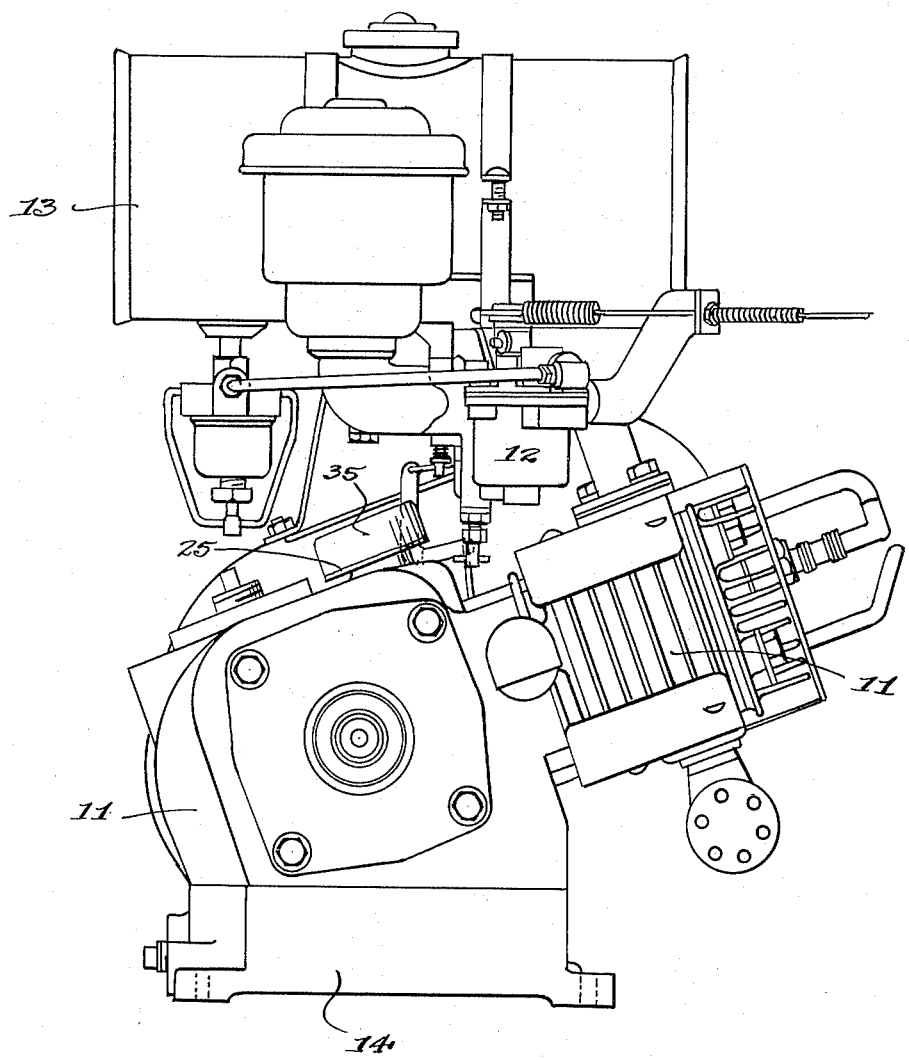

Fig. 8 is a side elevational view of a small external combustion engine embodying a breaker system only installed externally of the engine, and unlike the engine shown in Fig. 1 employs a vane type governor, and Fig. 9 is a vertical fragmentary sectional view through the engine shown in Fig. 8 and taken through the engine camshaft, similarly to Fig. 2.

The present engine in which our invention is incorporated, comprises a crankcase 10, a cylinder 11 to which is attached a conventional carburetor 12, and a fuel tank 13. The crankcase is fastened to a base 14. The cylinder 11 is disposed at a slant and the crankshaft 15 and camshaft 16 are preferably disposed at right angles to each other, the camshaft being driven at half crankshaft speed by the intermeshing spiral gears as will be plainly evident.

The camshaft is a two piece structure comprising a shaft 17 to which is pinned the camming sleeve structure 18, which carries the integral gear 19 driven by the gear 20 on the crankshaft and the cams 21 and 22 for respectively actuating the intake and exhaust valves of the engine.

The shaft 17 is supported in bearings 23 carried by the crankcase and is extended to project outside of and above the crankcase structure. A plate 25 is secured on top of the crankcase by a plurality of fastening screws 26, and a conventional breaker mechanism 27 is mounted on this plate, including a make and break mechanism 28, a condenser 29 and suitable electric connections 30, one lead of which is arranged to be carried out through the insulated washer 31 and to the engine spark plug (not shown). A casing or cap 35 is secured to this plate 25 with suitable spring snaps 26', and this cap houses the breaker mechanism 27 as well as the governor 28a which is mounted on the extreme outer end of the shaft 17.

It will be observed that the shaft 17 is eccentric to the circular plate 25 and the rotor of the breaker mechanism is mounted on the enlarged portion 17a of the shaft 17. The housing is provided with a circular dome-shaped housing portion 35a which encloses the governor structure 28a.

This governor comprises a pair of flyweights 36 pivotally mounted between the ears 37 and the channel shaped supporting plate 38 mounted on shaft 17, as at 39. The weights have ears 40 which extend through slots 41 in the hollow sleeve-like end portion of the shaft 17 and which engage the pin 42 slidably mounted in this axial bore 43 in the end of shaft 17. The pin 42 engages the arm 44 mounted on shaft 45 supported by the housing and extended to the outside of the housing. As the speed of the engine increases, the weights 36 are moved towards the dotted line position, sliding the pin 42 outwardly of shaft 17 and moving the arm 44 towards the dotted line position and thus rocking the shaft 45, which motion is resisted by spring 45a. The plate 38 serves as a stop for limiting the outward travel of weights 36.

The rotation of this shaft 45 in a clockwise direction tends to throttle the engine and slow same down by actuating the throttle valve carried by the carburetor 12 by means of suitable levers and linkage between arm 46 carried on shaft 45 and the carburetor. Lever 47 is capable of being adjusted to place more or less spring tension or lever 46, resisting its movement in a clockwise direction by the centrifugal forces of the weights 36. Such governor structures pre se are quite common and any suitable governor structure may be employed.

We have found that a very accurate and satisfactory governor action may be had by mounting a centrifugal type directly on the engine camshaft, operated at one-half crankshaft speed in a four-stroke cycle engine.

Likewise the mounting of the breaker mechanism on this half speed camshaft is quite advantageous from an operating and servicing point of view. Since the breaker unit will be thus driven at half crankshaft speed, it means that the life of the cam, the cam follower, the points and other parts of the breaker mechanism, should all be materially increased and approximately doubled in life. In addition, since only one spark will occur for every two revolutions of the crankshaft, it will also increase spark plug life because only half the number of sparks will be developed compared to many of the present small engine installations, where the breaker is mounted on the flywheel and driven at crankshaft speed, thus making a spark for each revolution of the crankshaft.

These units, the breaker mechanism and the governor structure, are completely enclosed and therefore can be made absolutely dust and moisture proof, which is a decided advantage in small engine operation.

The mounting of this assembly on the top external surface of the crankcase is made possible by the peculiar cylinder and crankcase construction (see Figs. 1 and 8) and these units are readily accessible for servicing at any time. In fact, this accessible locating of these units, facilitates economical manufacturing of the power plant as well as minimizing servicing cost and trouble.

In Fig. 8, only the breaker system is mounted externally of the engine and connected with the camshaft. The housing 35 has no dome structure 35a as shown in Figs. 1 and 2 since another type of engine governor is used in the engine illustrated in Figs. 8 and 9. The details of this governor as used with this engine of Fig. 8 forms no part of the present engine and is therefore not illustrated in detail.

We claim:

1. In an internal combustion engine having a crankcase, a crankshaft supported by the crankcase and a camshaft driven by said crankshaft and supported by the crankcase, said camshaft having an extension projecting through and beyond an external face of said crankcase, a breaker system and governor assembly comprising a breaker system mechanism assembled about the camshaft extension externally of the crankcase and driven by said camshaft, a governor assembly superimposed over said breaker system mechanism and drivingly secured to the extreme outer end of the camshaft extension, and a single housing structure secured to the crankcase and enclosing both said breaker system and governor assemblies.

2. In an internal combustion engine having a crankcase, a crankshaft supported by the crankcase and a camshaft driven by said crankshaft and supported by the crankcase, said camshaft having an extension projecting through and beyond an external face of said crankcase, a breaker system and governor assembly comprising a breaker system mechanism assembled about the camshaft extension externally of the crankcase and driven by said camshaft, a governor assembly superimposed over said breaker system mechanism and drivingly secured to the extreme outer end of the camshaft extension, a circular mounting plate secured to said crankcase and having an eccentric opening through which said camshaft extension projects, said breaker system assembly mounted directly on said plate, and a single housing structure secured to said mounting plate and enclosing both said breaker system and governor assemblies.

3. In an internal combustion engine having a crankcase, a crankshaft supported by the crankcase and a camshaft driven by said crankshaft and supported by the crankcase, said camshaft having an extension projecting through and beyond an external face of said crankcase, a breaker system and governor assembly comprising a breaker system mechanism assembled about the camshaft extension externally of the crankcase and driven by said camshaft, a circular mounting plate secured to said crankcase and having an eccentric opening through which said camshaft extension projects, said breaker system assembly mounted directly on said plate, and a single housing structure secured to said mounting plate and enclosing both said breaker system and governor assemblies, said housing structure comprising a breaker housing portion disposed concentric with said circular mounting plate and a second recessed dome-like housing portion eccentrically disposed with respect to said first housing portion and concentrically enclosing the said governor assembly.

4. In an internal combustion engine having a crankcase, a crankshaft supported by the crankcase and a camshaft driven by said crankshaft and supported by the crankcase, said camshaft having an extension projecting through and beyond an external face of said crankcase, a breaker system and governor assembly comprising a breaker system mechanism assembled about the camshaft extension externally of the crankcase and driven by said camshaft, a circular mounting plate secured to said crankcase and having an eccentric opening through which said camshaft extension projects, said breaker system assembly mounted directly on said plate, and a single housing structure secured to said mounting plate and enclosing both said breaker system and governor assemblies, said housing structure comprising a breaker housing portion disposed concentric with said circular mounting plate and a second recessed dome-like housing portion eccentrically disposed with respect to said first housing portion and concentrically enclosing the said governor assembly, said camshaft extension within said housing structure having an enlarged diameter portion adapted for supporting the breaker arm of said breaker mechanism and a further end portion of reduced diameter on which said governor is mounted.

5. A centrifugal engine speed governor assembly directly assembled to the extreme end portion of a rotating engine shaft and comprising a plate secured to the shaft, centrifugal governor weighted members pivotally supported by said plate and carrying radially inwardly extending ears, said shaft having an axially bored hole, and an actuator pin axially slidable in said hole and projecting beyond the extreme end of said shaft, said pin being engaged by said ears to be moved axially of the shaft on outward swinging movement of said weighted members when subjected to centrifugal forces on rotation of said shaft, said plate disposed in a plane normal to the shaft axis and providing a stop to limit the outward swinging movement of said weighted members.

6. In an internal combustion engine having a crankcase and a camshaft supported thereby and projecting through and beyond an external facing of said crankcase, a breaker system assembly mounted on said shaft externally of said crankcase, a centrifugal governor assembly directly assembled to the extreme end portion of said camshaft and comprising a plate secured to the camshaft, centrifugal governor weighted members pivotally supported by said late and carrying radially inwardly extending ears, said shaft having an axially bored hole, and an actuator pin axially slidable in said hole and projecting beyond the extreme end of said shaft, said pin being engaged by said ears to be moved axially of the shaft on outward swinging movement of said weighted members when subjected to centrifugal forces on rotation of said shaft, said plate disposed in a plane normal to the shaft axis and providing a stop to limit the outward swinging movement of said weighted members, and a housing structure removably secured to the crankcase and enclosing said breaker system assembly.

7. In an internal combustion engine having a crankcase, a crankshaft supported by the crankcase and a camshaft driven by said crankshaft and supported by the crankcase, said camshaft having an extension projecting through and beyond an external face of said crankcase, a breaker system and governor assembly comprising a breaker system mechanism assembled about the camshaft extension externally of the crankcase and driven by said camshaft, a circular mounting plate secured directly to said crankcase and having an opening eccentric to said circular plate through which the camshaft extension projects, said breaker system assembly mounted on said plate, and a housing structure removably secured to said mounting plate and enclosing said breaker system assembly.

8. In a single cylinder internal combustion engine of the spark ignition type having a crankcase and an inclined cylinder secured to the crankcase and projected to one side of the crankcase and a camshaft supported by the crankcase and disposed generally vertical and projected through and beyond an external top surface of the crankcase, a breaker system assembly comprising a mounting plate secured directly to said top surface of the crankcase and having an opening through which said camshaft extends, a breaker system mechanism assembled about the camshaft extension, said mechanism mounted on said plate and driven by the camshaft, and a housing structure removably secured to said mounting plate and enclosing said breaker system mechanism.

References Cited in the file of this patent

UNITED STATES PATENTS

| | | |
|---|---|---|
| Re. 13,682 | Day et al. | Feb. 3, 1914 |
| 872,138 | Mayer | Nov. 26, 1907 |
| 1,195,399 | Riker | Aug. 22, 1916 |
| 1,299,555 | Cosgray | Apr. 8, 1919 |
| 1,430,524 | Kettering | Sept. 26, 1922 |
| 1,432,444 | Dake | Oct. 17, 1922 |
| 1,541,052 | Hunt | June 9, 1925 |
| 1,626,364 | Starr | Apr. 26, 1927 |
| 1,692,845 | Kolb | Nov. 27, 1928 |
| 1,919,536 | Sticelber | July 25, 1933 |
| 2,174,676 | Yarian | Oct. 3, 1939 |
| 2,472,327 | Zoerlein | June 7, 1949 |
| 2,499,263 | Troy | Feb. 28, 1950 |
| 2,590,134 | Slonneger | Mar. 25, 1952 |